(12) United States Patent
Oku

(10) Patent No.: US 8,634,680 B2
(45) Date of Patent: Jan. 21, 2014

(54) WAVELENGTH CONTROL DEVICE AND WAVELENGTH CONTROL METHOD

(75) Inventor: Noriyoshi Oku, Tokyo (JP)

(73) Assignee: NEC Corporation, Tokyo (JP)

(*) Notice: Subject to any disclaimer, the term of this patent is extended or adjusted under 35 U.S.C. 154(b) by 281 days.

(21) Appl. No.: 13/113,243

(22) Filed: May 23, 2011

(65) Prior Publication Data

US 2011/0286696 A1 Nov. 24, 2011

(30) Foreign Application Priority Data

May 24, 2010 (JP) ................................. 2010-118152

(51) Int. Cl.
*G02F 1/295* (2006.01)
*G02B 6/26* (2006.01)

(52) U.S. Cl.
USPC ....... 385/9; 385/8; 385/27; 356/477; 359/315

(58) Field of Classification Search
USPC ........ 385/1–4, 8, 9, 15, 27, 39; 359/237, 238, 359/315; 356/450, 477
See application file for complete search history.

(56) References Cited

U.S. PATENT DOCUMENTS

| 5,359,412 A * | 10/1994 | Schulz .......................... 356/478 |
| 6,560,381 B2 * | 5/2003 | Hatayama et al. .............. 385/15 |
| 6,633,698 B2 * | 10/2003 | Hatayama et al. .............. 385/27 |

FOREIGN PATENT DOCUMENTS

JP 2-307027 A 12/1990

* cited by examiner

*Primary Examiner* — Daniel Petkovsek

(57) ABSTRACT

The wavelength control device comprises a first Mach-Zehnder filter which receives a first optical signal and outputs an optical signal having a predetermined wavelength, a second Mach-Zehnder filter which receives a second optical signal and outputs an optical signal having a predetermined wavelength, a heating unit heating respective parts of either one of the waveguides of the first and second Mach-Zehnder filters, a first wavelength detecting unit which receives an optical signal from the first Mach-Zehnder filter and detects a wavelength thereof, a second wavelength detecting unit which receives an optical signal from the second Mach-Zehnder filter and detects a wavelength thereof, a power control unit which controls power supplied to the heating unit based on the wavelength received from the first wavelength detecting unit, and an output unit which outputs a wavelength value based on the wavelength received from the second wavelength detecting unit.

4 Claims, 5 Drawing Sheets

WAVELENGTH CONTROL DEVICE AND WAVELENGTH CONTROL METHOD

INCORPORATION BY REFERENCE

This application is based on Japanese Patent Application No. 2010-118152 filed on May 24, 2010 and including specification, claims, drawings and summary. The disclosure of the above Japanese Patent Application is incorporated herein by reference in its entirety.

TECHNICAL FIELD

The present invention relates to a wavelength control device that can adjust the wavelength of local oscillated light in accordance with the wavelength of signal light, and a wavelength control method.

BACKGROUND ART

The recent increase of information amount communicated over communication lines demands the increasing a bit rate per single wavelength in optical communication networks. However, in order to transmit a signal by a single wavelength through a high-speed line at 40 Gbit/second, and 100 Gbit/second, etc., it is difficult to obtain sufficient transmissive characteristics even though a conventional intensity modulation/direct detection scheme is adopted. Consequently, a new digital coherent scheme is adopted. According to the digital coherent scheme, a local oscillation light source that is unnecessary in the case of the direct detection scheme is provided inside a coherent optical receiver. It is extremely important to control the wavelength of local oscillated light output by that local oscillation light source to match the wavelength of transmitted signal light or to be within predetermined wavelength difference range thereof.

For example, in the case of homodyne detection, respective wavelengths of the signal light and the local oscillated light need to be controlled so as to be substantially same. In general, an appropriate signal processing become unable when the wavelength difference between the signal light and the local oscillated light is out of the range within approximately ±10 pm. Moreover, the load of the signal processing for detecting a wavelength mismatch is large. Consequently, it is desirable that a wavelength relationship between the signal light and the local oscillated light should be stable as much as possible. However, even if lasers which are controlled to be extremely stable are used as the light sources of the signal light and the local oscillated light in general, a wavelength variation of approximately ±20 pm occurs at each light source. Accordingly, when both wavelength variations are combined, the wavelength variation of ±40 pm occurs at a maximum.

Because of the above-explained circumstance, a technology for highly precise control of the wavelength of light output by the local oscillation light source provided in the coherent optical receiver is proposed. For example, Unexamined Japanese Patent Application KOKAI Publication No. H02-307027 discloses a measurement device for highly precise measurement of the frequency of signal light. The measurement device measures the frequency of signal light based on the frequency of an optical signal that is obtained by synthesizing light (local oscillated light) output by a frequency-variable light source with light (signal light) output by a measurement-target light source, and the frequency of local oscillated light. By using such a measurement device, it becomes possible to adjust the wavelength of the local oscillated light to follow the wavelength of the signal light.

However, the forgoing measurement device uses a fabry-perot etalon resonator. Such a resonator needs a predetermined size in order to prevent interference of lights output by the frequency-variable light source and by a frequency reference light source. Consequently, it is necessary to increase the size of the coherent optical receiver having the measurement device. Moreover, it is necessary to set a large resonator to be horizontal in order to execute highly precise frequency control.

SUMMARY

The present invention has been made in view of the foregoing circumstances, and it is an exemplary object of the present invention to provide a wavelength control device with a simple configuration which enables highly precise wavelength control even though it is compact in size, and a wavelength control method.

A wavelength control device according to a first aspect of the present invention that accomplishes the above object comprises: a first Mach-Zehnder filter which includes two waveguides, receives a first optical signal from an end of either one of the two waveguides, and outputs a predetermined optical signal from the two waveguides based on a wavelength of the first optical signal; a second Mach-Zehnder filter which includes two waveguides, receives a second optical signal from an end of either one of the two waveguides, and outputs a predetermined optical signal from the two waveguides based on a wavelength of the second optical signal; a heating unit which heats a part of either one of the waveguides of the first Mach-Zehnder filter and a part of either one of the waveguides of the second Mach-Zehnder filter; a first wavelength detecting unit which detects a wavelength of the optical signal received by the first Mach-Zehnder filter based on an intensity of the optical signal output by the two waveguides of the first Mach-Zehnder filter; a second wavelength detecting unit which detects a wavelength of the optical signal received by the second Mach-Zehnder filter based on an intensity of the optical signal output by the two waveguides of the second Mach-Zehnder filter; a power control unit which adjusts a heating level by controlling power to be supplied to the heating unit based on the wavelength detected by the first wavelength detecting unit; and an output unit which outputs a signal instructing a wavelength of the second optical signal based on the wavelength detected by the second wavelength detecting unit.

A wavelength control method according to a second exemplary aspect of the present invention which accomplishes the above object and which is executed by a wavelength control device comprising: a first Mach-Zehnder filter which includes two waveguides, receives a first optical signal from an end of either one of the two waveguides, and outputs a predetermined optical signal from the two waveguides based on a wavelength of the first optical signal; a second Mach-Zehnder filter which includes two waveguides, receives a second optical signal from an end of either one of the two waveguides, and outputs a predetermined optical signal from the two waveguides based on a wavelength of the second optical signal; a heating unit; a first wavelength detecting unit; a second wavelength detecting unit; a power control unit; and an output unit, the wavelength control method including: a heating process in which the heating unit heats a part of either one of the waveguides of the first Mach-Zehnder filter and a part of either one of the waveguides of the second Mach-Zehnder filter; a first wavelength detecting process in which the first wavelength detecting unit detects a wavelength of the optical signal received by the first Mach-Zehnder filter based on an intensity of the optical signal output by the two waveguides of the first Mach-Zehnder filter; a second wavelength detecting process in which the second wavelength detecting unit detects a wavelength of the optical signal received by the second Mach-Zehnder filter based on an intensity of the optical signal output by the two waveguides of the second Mach-Zehnder filter; a power control process in which the power control unit adjusts a heating level by controlling power to be supplied to the heating unit based on the wavelength detected by the first wavelength detecting unit; and an outputting process in which the output unit outputs a signal instructing a wavelength of the second optical signal based on the wavelength of detected by the second wavelength detecting unit.

A wavelength control device according to a third aspect of the present invention comprises: a first Mach-Zehnder filter which includes two waveguides, receives a first optical signal from an end of either one of the two waveguides, and outputs a predetermined optical signal from the two waveguides based on a wavelength of the first optical signal; a second Mach-Zehnder filter which includes two waveguides, receives a second optical signal from an end of either one of the two waveguides, and outputs a predetermined optical signal from the two waveguides based on a wavelength of the second optical signal; heating means for heating a part of either one of the waveguides of the first Mach-Zehnder filter and a part of either one of the waveguides of the second Mach-Zehnder filter; first wavelength detecting means for detecting a wavelength of the optical signal received by the first Mach-Zehnder filter based on an intensity of the optical signal output by the two waveguides of the first Mach-Zehnder filter; second wavelength detecting means for detecting a wavelength of the optical signal received by the second Mach-Zehnder filter based on an intensity of the optical signal output by the two waveguides of the second Mach-Zehnder filter; power control means for adjusting a heating level by controlling power to be supplied to the heating unit based on the wavelength detected by the first wavelength detecting means; and output means for outputting a signal instructing a wavelength of the second optical signal based on the wavelength detected by the second wavelength detecting means.

According to the present invention, there are provided a compact wavelength control device that enables highly precise wavelength control and a wavelength control method.

BRIEF DESCRIPTION OF THE DRAWINGS

These objects and other objects and advantages of the present invention will become more apparent upon reading of the following detailed description and the accompanying drawings in which.

EXEMPLARY EMBODIMENT

Figure 1:
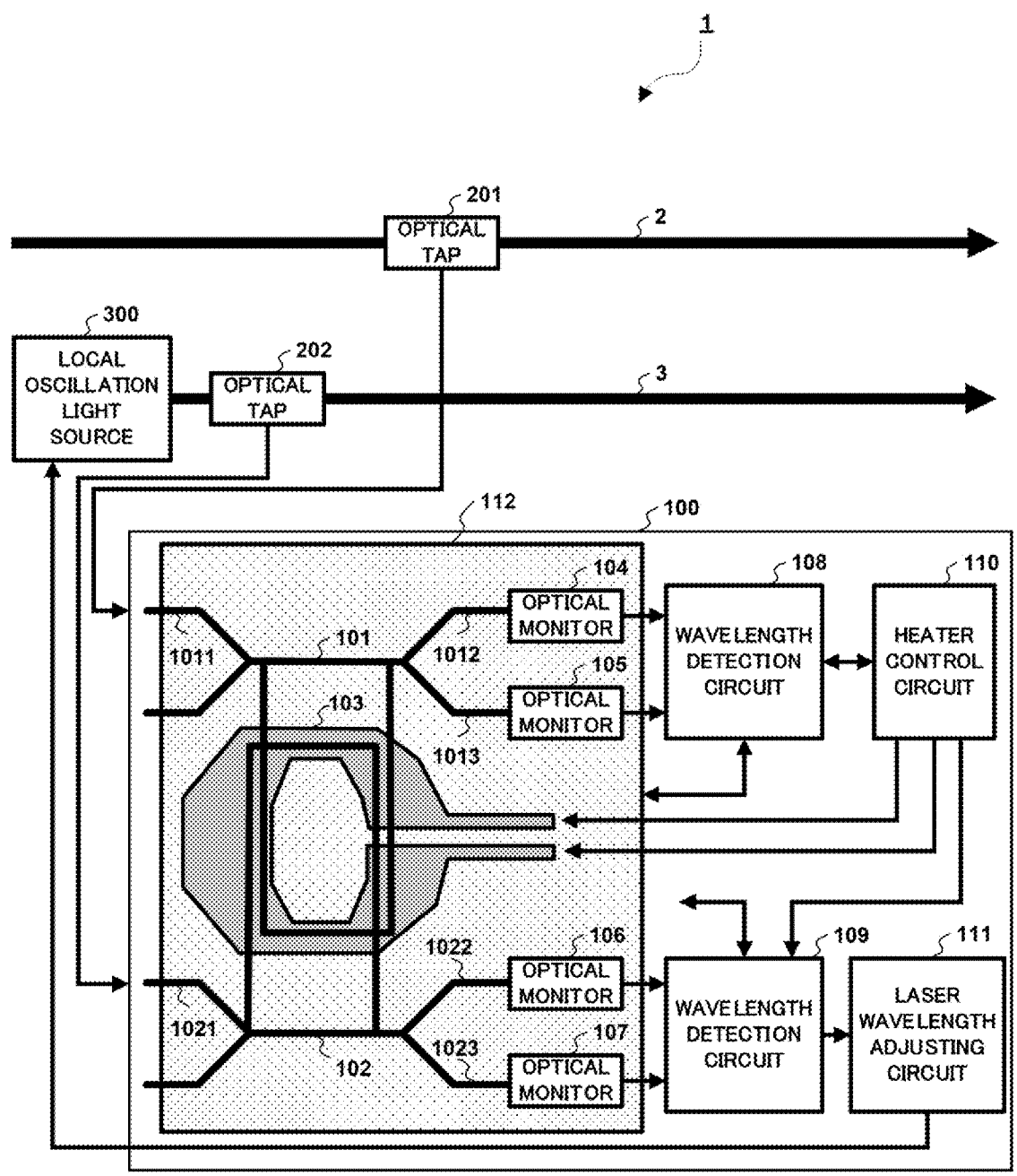
FIG. 1 shows a whole configuration of a wavelength control device according to an embodiment of the present invention.

A wavelength control device 100 according to an embodiment of the present invention is provided as a component of a coherent optical receiver 1. The coherent optical receiver 1 of the embodiment includes the wavelength control device 100, a local oscillation light source 300 that outputs local oscillated light 3, an optical tap 201 that divides signal light 2 received by the coherent optical receiver 1, and an optical tap 202 that divides the local oscillated light 3.

The wavelength control device 100 receives the signal light 2 divided by the optical tap 201 and the local oscillated light 3 divided by the optical tap 202. Next, the wavelength control device 100 controls the wavelength of the local oscillated light 3 so as to maintain a constant difference between the wavelength value of the local oscillated light 3 and the wavelength value of the signal light 2.

The wavelength control device 100 will be explained in detail below with reference to the accompanying drawings.

The wavelength control device 100 includes asymmetric Mach-Zehnder filters 101 and 102, a wavelength adjusting heater 103, optical monitors 104, 105, 106, and 107, wavelength detection circuits 108 and 109, a heater control circuit 110, a laser wavelength adjusting circuit 111, and a temperature control circuit 112.

The asymmetric Mach-Zehnder filters 101 and 102 and the wavelength adjusting heater 103 are configured on the same PLC (Planer Lightwave Circuit) substrate. The asymmetric Mach-Zehnder filters 101 and 102 share the wavelength adjusting heater 103. The temperature control circuit 112 includes the asymmetric Mach-Zehnder filters 101 and 102, the wavelength adjusting heater (a heating unit) 103, and the optical monitors 104, 105, 106, and 107.

Some of the signal light 2 which is divided by the optical tap 201 is guided to an input port 1011 of the asymmetric Mach-Zehnder filter 101 through a waveguide. Moreover, some of the local oscillated light 3 which is divided by the optical tap 202 is guided to an input port 1021 of the asymmetric Mach-Zehnder filter 102 through a waveguide.

The asymmetric Mach-Zehnder filters 101 and 102 each have two waveguides. Accordingly, optical signal 2 (local oscillated light 3) that is introduced from the input port 1011 (1021) passes through the asymmetric Mach-Zehnder filter 101 (102) along the waveguide, and is output by output ports 1012 and 1013 (1022 and 1023). Because the optical signal 2 (local oscillated light 3) passes through the asymmetric Mach-Zehnder filter 101 (102), such optical signal (or local oscillated light) is output by the output ports 1012 and 1013 (1022 and 1023) at an intensity in accordance with the wavelength of the optical signal (or local oscillated light).

Hereinafter, the ratio of the intensity of the optical signal which has passed through the asymmetric Mach-Zehnder filter 101 (102) (and which is output by respective output ports 1012 and 1013 (1022 and 1023)) relative to the intensity of the optical signal that has entered from the input port 1011 (1021) is referred to as a "filter transmittance".

Figure 2:
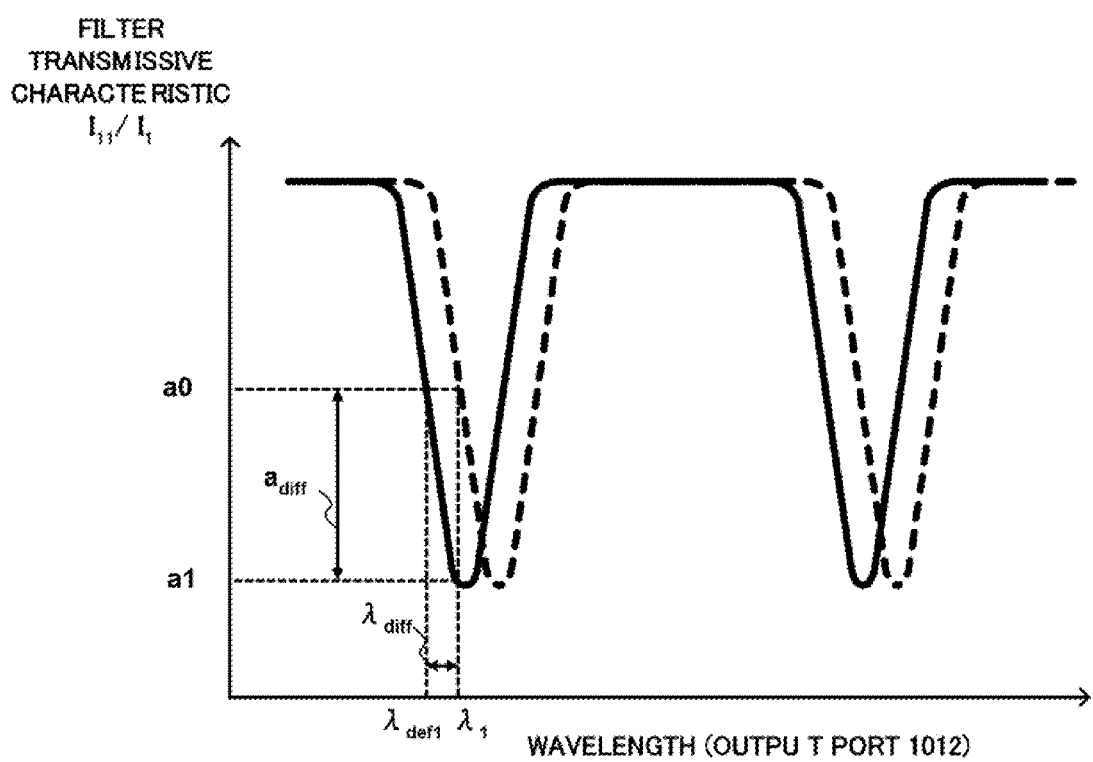
FIG. 2 shows a relationship (an optical monitor 104) between the wavelength of signal light and a filter transmittance.
Figure 3:
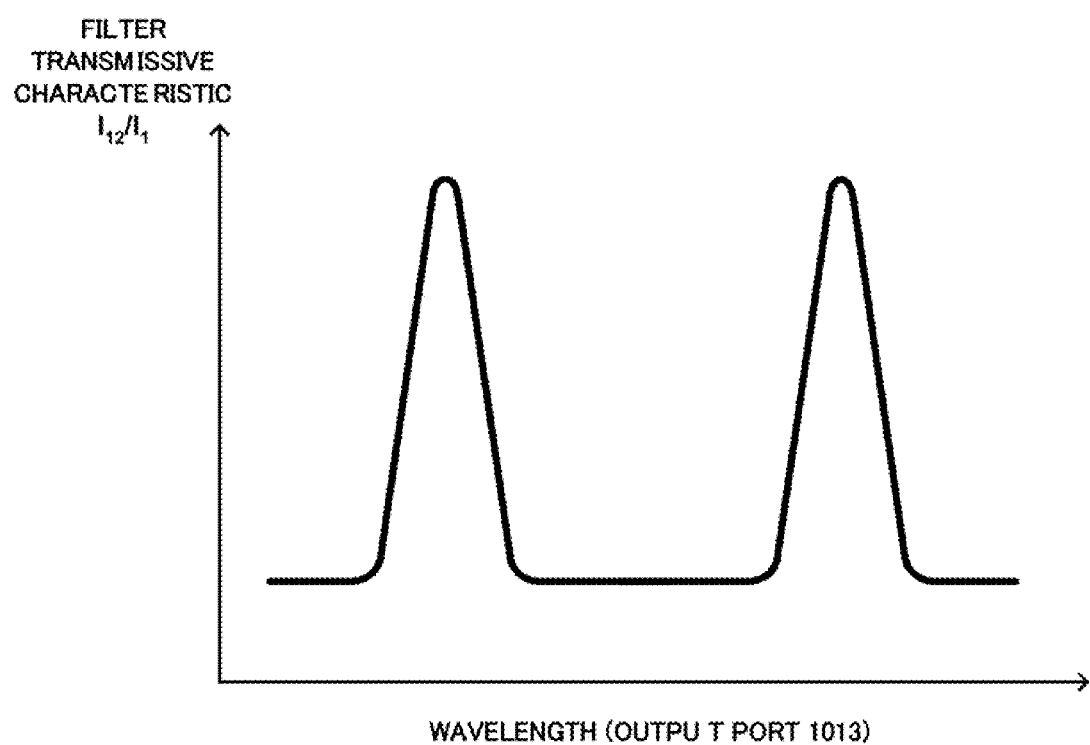
FIG. 3 shows a relationship (an optical monitor 105) between the wavelength of signal light and a filter transmittance.
Figure 4:
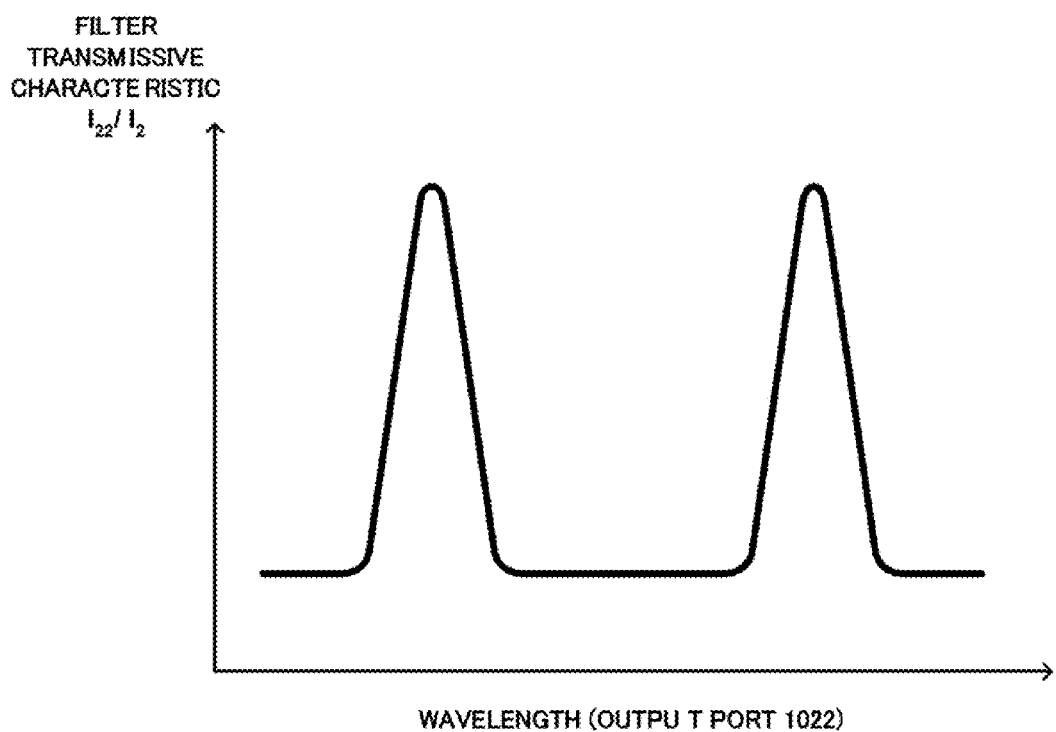
FIG. 4 shows a relationship (an optical monitor 106) between the wavelength of local oscillated light and a filter transmittance.

The asymmetric Mach-Zehnder filter 101 has a cyclic filter transmissive characteristic shown in, for example, FIG. 2 (indicated by a continuous line) regarding optical signal output by the output port 1012. Moreover, the asymmetric Mach-Zehnder filter 101 has a filter transmissive characteristic shown in FIG. 3 regarding the optical signal output by the output port 1013. The asymmetric Mach-Zehnder filter 102 has a cyclic filter transmissive characteristic shown in, for example, FIG. 4 regarding the optical signal output by the output port 1022. Moreover, the asymmetric Mach-Zehnder filter 102 has a filter transmissive characteristic shown in FIG. 5 (indicated by a continuous line) regarding the optical signal output by the output port 1023. A relationship "the filter transmittance of FIG. 2 (indicated by a continuous line)"+"the filter transmittance of FIG. 3"=1, and a relationship "the filter transmittance of FIG. 4"+"the filter transmittance of FIG. 5 (indicated by a continuous line)"=are satisfied.

The wavelength adjusting heater 103 heats a part of the waveguide of the asymmetric Mach-Zehnder filter 101 and a part of the waveguide of the asymmetric Mach-Zehnder filter 102 with power supplied from the heater control circuit 110. The heated part has a refraction index changed, and thus the propagation velocity of light at that part decreases. This produces a shifting between the phase of optical signal passing through the waveguide of either one of the asymmetric Mach-Zehnder filters 101 and 102, and the phase of optical signal passing through the waveguide of another filter, and respective outputs by the output ports 1012, 1013, 1022, and 1023 change. That is, by heating respective parts of the waveguides of the asymmetric Mach-Zehnder filters 101 and 102, respective filter transmissive characteristics of the asymmetric Mach-Zehnder filters 101 and 102 change.

The optical monitors 104, 105, 106, and 107 detect the intensities of light output by respective output ports 1012, 1013, 1022, and 1023. The optical monitors 104 to 107 each comprise, for example, a photodiode.

The optical monitor 104 detects an intensity $I_{11}$ of light output by the output port 1012, the optical monitor 105 detects an intensity $I_{12}$ of light output by the output port 1013, the optical monitor 106 detects an intensity $I_{22}$ of light output by the output port 1022, and the optical monitor 107 detects an intensity $I_{21}$ of light output by the output port 1023.

Next, the optical monitors 104 and 105 notify the wavelength detection circuit 108 of respective detected light intensities $I_1$ and $I_{12}$, and the optical monitors 106 and 107 notify the wavelength detection circuit 109 of respective detected light intensities $I_{21}$ and $I_{22}$.

The wavelength detection circuits 108 and 109 each comprise, for example, a CPU (Central Processing Unit) and a RAM (Random Access Memory). The RAM of the wavelength detection circuits 108 stores a formula representing the filter transmissive characteristic shown in FIG. 2 (indicated by a continuous line). Moreover, the RAM of the wavelength detection circuit 109 stores a formula representing the filter transmissive characteristic shown in FIG. 5 (indicated by a continuous line). These formulae representing respective filter transmissive characteristics are set based on respective temperatures of the asymmetric Mach-Zehnder filters 101 and 102. Respective temperatures of the asymmetric Mach-Zehnder filters 101 and 102 are obtained based on a set temperature by a temperature control circuit 112 to be discussed later and by input power supplied to the wavelength adjusting heater 103 by the heater control circuit 110.

The wavelength detection circuits 108 and 109 obtain respective filter transmissive characteristics of optical signals passed through respective asymmetric Mach-Zehnder filters 101 and 102 based on light intensities received from the optical monitors 104 to 107. Thereafter, the wavelength detection circuits 108 and 109 detect respective wavelengths of lights passed through respective asymmetric Mach-Zehnder filters 101 and 102 by applying the filter transmissive characteristics to respective formulae representing the filter transmissive characteristics. The formulae to which the filter transmissive characteristics are applied are set based on respective temperatures of the asymmetric Mach-Zehnder filters 101 and 102.

More specifically, the wavelength of light that passed through the asymmetric Mach-Zehnder filter 101 (the light that is output by the output port 1012) is obtained as follows.

First, the wavelength detection circuit 108 obtains the temperature of the asymmetric Mach-Zehnder filter 101 from the set temperature by the temperature control circuit 112 and from the input power supplied to the wavelength adjusting heater 103 by the heater control circuit 110. Next, the formula of the filter transmissive characteristic of the asymmetric Mach-Zehnder filter 101 corresponding to that temperature is obtained. It is presumed in the embodiment that the formula of the filter transmissive characteristic of the asymmetric Mach-Zehnder filter 101 is a formula representing FIG. 2 (indicated by a continuous line).

The wavelength detection circuit 108 obtains the sum of the light intensity $I_{11}$ notified by the optical monitor 104 and the light intensity $I_1$, notified by the optical monitor 105 ($I_1 = I_{11} + I_{12}$), and obtains the intensity notified by the optical monitor 104 with respect to the sum $I_1$. That is, a filter transmittance $I_{11}/I_1$ at the output port 1012 of the asymmetric Mach-Zehnder filter 101 is obtained. Next, a wavelength is obtained based on the obtained filter transmittance $I_{11}/I_1$ with reference to the formula representing the filter transmissive characteristic of FIG. 2 (indicated by a continuous line). When the filter transmittance $I_{11}/I_1$ at the output port 1012 is, for example, "a1", the obtained wavelength of the signal light is "$\lambda_1$".

On the other hand, the wavelength of light that passed through the asymmetric Mach-Zehnder filter 102 (the light that is output by the output port 1023) is obtained as follows.

First, the wavelength detection circuit 109 obtains the temperature of the asymmetric Mach-Zehnder filter 102 from the set temperature by the temperature control circuit 112 and from the input power supplied to the wavelength adjusting heater 103 by the heater control circuit 110. Next, the formula of the filter transmissive characteristic of the asymmetric Mach-Zehnder filter 102 corresponding to that temperature is obtained. It is presumed in the embodiment that the formula of the filter transmissive characteristic of the asymmetric Mach-Zehnder filter 102 is a formula representing FIG. 5 (indicated by a continuous line).

The wavelength detection circuit 109 obtains the sum of the light intensity $I_{22}$ notified by the optical monitor 106 and the light intensity $I_{21}$ notified by the optical monitor 107 ($I_2 = I_{21} + I_{22}$), and obtains the intensity notified by the optical monitor 107 with respect to the sum $I_2$. That is, a filter transmittance $I_{21}/I_2$ at the output port 1023 of the asymmetric Mach-Zehnder filter 102 is obtained. Next, a wavelength is obtained based on the obtained filter transmittance $I_{21}/I_2$ with reference to the formula representing the filter transmissive characteristic of FIG. 5 (indicated by a continuous line). When the filter transmittance $I_{21}/I_2$ at the output port 1023 is, for example, "b0", the obtained wavelength of the local oscillated light is "$\lambda_{def2}$".

Moreover, the wavelength detection circuit 108 sends a signal indicating the filter transmittance "a1" of the current signal light 2 to the heater control circuit 110.

The heater control circuit 110 comprises, for example, a CPU, a RAM, and a power control circuit. The RAM of the heater control circuit 110 possesses a reference value "a0" of the filter transmittance of the asymmetric Mach-Zehnder filter 101. The reference value "a0" is, in the formula representing the filter transmissive characteristic of FIG. 2 (indicated by a continuous line), a value corresponding to a value "$\lambda_{def1}$" of the wavelength that is a reference value of the signal light 2.

When the wavelength of the signal light 2 before the varying of the wavelength of the signal light 2 is detected is "$\lambda_{def1}$", the wavelength of the local oscillated light 3 at this time is set to be a value "$\lambda_{def2}$," maintaining a constant difference from the wavelength of the signal light 2 "$\lambda_{def1}$".

When the value "$\lambda_1$" obtained from the filter transmittance does not match "$\lambda_{def1}$", it means that the wavelength of the signal light 2 varies because of some reason. Because the wavelength of the local oscillated light 3 is set to be the value "$\lambda_{def2}$" which is a constant difference from the wavelength "$\lambda_{def1}$" that is the reference value to the signal light 2, when the wavelength of the signal light 2 changes to be "$\lambda_1$", the wavelength difference between the signal light 2 and the local oscillated light 3 becomes out of the forgoing constant value. Accordingly, the heater control circuit 110 adjusts power P supplied to the wavelength adjusting heater 103, thereby changing the filter transmissive characteristics of respective asymmetric Mach-Zehnder filters 101 and 102. Consequently, the wavelength detection circuit 109 obtains the wavelength of the local oscillated light 3 maintaining the forgoing constant value relative to the wavelength "$\lambda_1$" of the signal light 2. The laser wavelength adjusting circuit 111 changes the wavelength of the local oscillated light 3 based on the wavelength obtained by the wavelength detection circuit 109.

More specifically, the heater control circuit 110 controls the power supplied to the wavelength adjusting heater 103 so that the asymmetric Mach-Zehnder filter 101 has the filter transmittance "a0" to the signal light 2 when the wavelength of the signal light 2 is "$\lambda_{def1}$" relative to the signal light 2 having the wavelength varied. That is, the heater control circuit 110 controls the power P supplied to the wavelength adjusting heater 103 so that the filter transmittance "a1" to the signal light 2 having the wavelength "$\lambda_1$" becomes the reference value "a0".

When the change amount of the power P supplied to the wavelength adjusting heater 103 is, for example, $\Delta P$, and the difference in the filter transmittances is "$a_{diff}(=a0-a1)$", the change amount $\Delta P$ of the power P supplied to the wavelength adjusting heater 103 is set to be, based on a PID control, as follows:

$$\Delta P = A \cdot a_{diff} + B \cdot \int a_{diff} dt + C \cdot da_{diff}/dt + D$$

where A, B, C, and D are arbitrary constants.

When the power P to be supplied increases relative to the power currently supplied, the wavelength adjusting heater 103 further heats the waveguide of the asymmetric Mach-Zehnder filter 101. This causes the phase of the optical signal to be shifted, and the filter transmissive characteristic of the asymmetric Mach-Zehnder filter 101 changes, for example, from a continuous line in FIG. 2 to a dotted line in FIG. 2. This causes the filter transmittance of the signal light 2 having the wavelength to be the reference value "a0".

Figure 5:
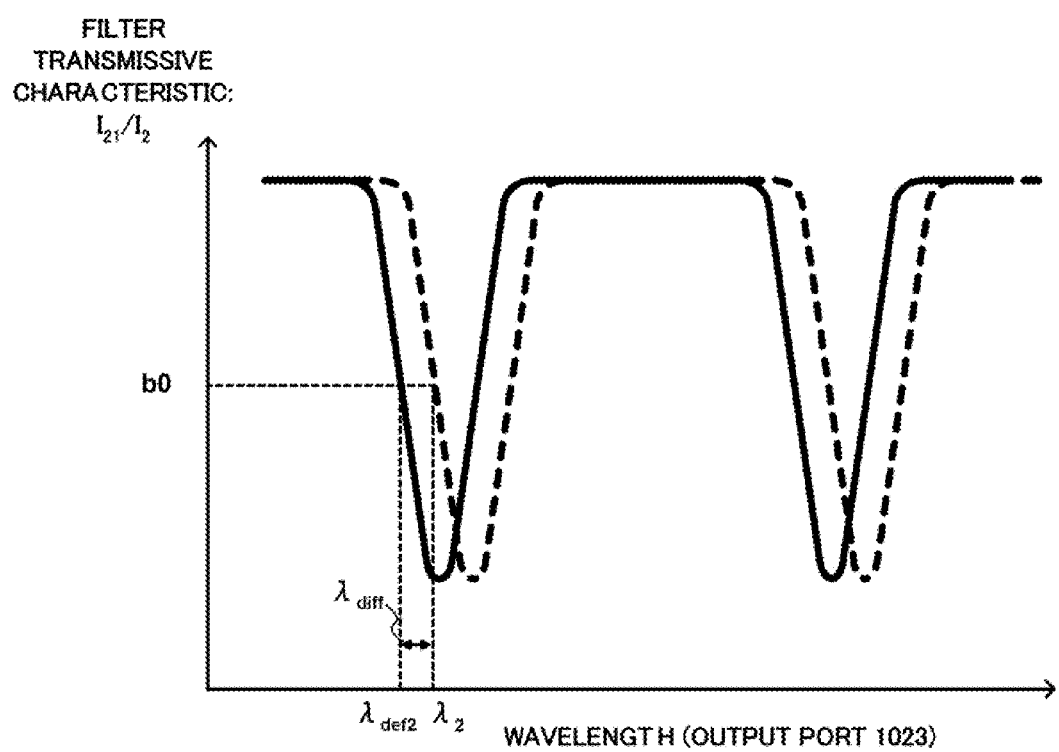
FIG. 5 shows a relationship (an optical monitor 107) between the wavelength of local oscillated light and a filter transmittance.

Because the wavelength adjusting heater 103 also heats the waveguide of the asymmetric Mach-Zehnder filter 102, when the power P increases, the filter transmissive characteristic of the asymmetric Mach-Zehnder filter 102 changes from a continuous line in FIG. 5 to a dotted line in FIG. 5.

The laser wavelength adjusting circuit 111 comprises, for example, a CPU and a RAM. The laser wavelength adjusting circuit 111 transmits a signal specifying the wavelength of the local oscillated light 3 oscillated by the local oscillation light source 300 based on a signal indicating the value of the wavelength received from the wavelength detection circuit 109.

The wavelength specified to the local oscillation light source 300 can be obtained as follows.

First, when the filter transmissive characteristic of the asymmetric Mach-Zehnder filter 101 changes, the filter transmissive characteristic of the asymmetric Mach-Zehnder filter 102 sharing the wavelength adjusting heater 103 also changes. That is, the transmissive characteristic of the asymmetric Mach-Zehnder filter 102 changes following to the varying of the signal light 2. For example, when the filter transmissive characteristic of the asymmetric Mach-Zehnder filter 101 changes from the continuous line in FIG. 2 to the dotted line in FIG. 2, the filer transmissive characteristic of the asymmetric Mach-Zehnder filter 102 also changes from the continuous line in FIG. 5 to the dotted line in FIG. 5. At this time, the wavelength of the local oscillated light 3 does not vary, and the wavelength of the optical signal passing through the asymmetric Mach-Zehnder filter 102 (the optical signal output to the output port 1023) is, for example, "$\lambda_{def2}$". On the other hand, the wavelength detection circuit 109 obtains the wavelength corresponding to the filter transmittance "b0" as "$\lambda_2$", and notifies the laser wavelength adjusting circuit 111 of a signal indicating the wavelength "$\lambda_2$".

The laser wavelength adjusting circuit 111 transmits a signal specifying the wavelength of the local oscillated light 3 oscillated by the local oscillation light source 300 to be "$\lambda_2$", and the local oscillation light source 300 outputs the local oscillated light 3 having the wavelength of "$\lambda_2$".

The temperature control circuit 112 comprises, for example, a CPU, a RAM, and a Peltier device. The temperature control circuit 112 has a function of maintaining respective temperatures of the asymmetric Mach-Zehnder filters 101 and 102 to be constant in cooperation with the heater control circuit 110. Accordingly, respective filter transmissive characteristics of the asymmetric Mach-Zehnder filters 101 and 102 are stabilized. Moreover, by monitoring temperatures controlled by the temperature control circuit 112 and input power to the wavelength adjusting heater 103, respective temperatures of the asymmetric Mach-Zehnder filters 101 and 102 become known, and it becomes possible to monitor respective initial filter transmissive characteristics of the asymmetric Mach-Zehnder filters 101 and 102. That is, it is possible to monitor which slope of the filter transmissive characteristic shown in FIGS. 2 to 5 the asymmetric Mach-Zehnder filter uses.

A wavelength control operation to the local oscillated light 3 performed by the wavelength control device 100 will be explained below.

When the reference value of the signal light 2 is a wavelength "$\lambda_{def1}$" and the reference value of the local oscillated light 3 is a wavelength "$\lambda_{def2}$", the wavelength control device 100 controls the wavelength of the local oscillated light 3 so that the wavelength difference "$\lambda_{shift}(=\lambda_{def1}-\lambda_{def2})$" between the signal light 2 and the local oscillated light 3 becomes stable. When the wavelength of the signal light 2 is "$\lambda_{def1}$" and the wavelength of the local oscillated light 3 is "$\lambda_{def2}$", it is presumed that the power that is supplied to the wavelength adjusting heater 103 by the heater control circuit 110 is P, and the temperature of the wavelength adjusting heater 103 is T.

When the wavelength of the signal light 2 varies from "$\lambda_{def1}$" to "$\lambda_1$" because of some reason, the wavelength control device 100 causes, as is indicated below, the wavelength of the local oscillated light 3 to be changed to "$\lambda_2 (=\lambda_1-\lambda_{shift})$" having a constant difference "$\lambda_{shift}$" from "$\lambda_1$".

First, when the coherent optical receiver 1 receives the signal light 2, the signal light 2 is divided by the optical tap 201, and is guided to the input port 1011 of the asymmetric Mach-Zehnder filter 101.

The signal light 2 that has entered from the input port 1011 passes through the two waveguides of the asymmetric Mach-Zehnder filter 101, and is output by respective output ports 1012 and 1013 to respective optical monitors 104 and 105. The optical monitor 104 detects the light intensity $I_{11}$ output by the output port 1012, and the optical monitor 105 detects the light intensity $I_{12}$ output by the output port 1013. Thereafter, the optical monitors 104 and 105 notify the wavelength detection circuit 108 of signals indicating respective values of detected light intensities.

The wavelength detection circuit 108 obtains the sum $I_1$ ($=I_{11}+I_{12}$) of the light intensity $I_{11}$ indicated by the signal notified by the optical monitor 104 and the light intensity $I_{12}$ indicated by the signal notified by the optical monitor 105, and obtains the filter transmittance $I_{11}/I_1$ of the light passing through the optical monitor 104. When the obtained filter transmittance is "a1", the wavelength of the signal light 2 is obtained as "$\lambda_1$" shifted from the wavelength "$\lambda_{def1}$" that is the reference based on the formula of the filter transmissive characteristic (the formula representing the continuous line in FIG. 2). The wavelength detection circuit 108 notifies the heater control circuit 110 of respective signals indicating the filter transmittance "a1" and the obtained wavelength "$\lambda_1$" of the signal light 2.

The heater control circuit 110 controls the power P supplied to the wavelength adjusting heater 103 so that the filter transmittance "a1" of the signal light 2 having the wavelength "$\lambda_1$" becomes the reference value "a0". The power to be supplied is changed from, for example, P to P+ΔP. When the power increases, the temperature of the wavelength adjusting heater 103 rises from T to T+ΔT, and the refraction index of one of the waveguides of the asymmetric Mach-Zehnder filters 101 and 102 which are heated by the wavelength adjusting heater 103 becomes large. This causes the filter transmissive characteristic of the asymmetric Mach-Zehnder filter 101 to be shifted by "$\lambda_{diff}$" in a horizontal direction so as to compensate the difference "$a_{diff}$" of the filter transmittances, and changes from the continuous line in FIG. 2 to the dotted line in FIG. 2.

On the other hand, the local oscillated light 3 output by the local oscillation light source 300 of the coherent optical receiver 1 is divided by the optical tap 202, and is guided to the input port 1021 of the asymmetric Mach-Zehnder filter 102.

The local oscillated light 3 that has entered from the input port 1021 passes through the two waveguides of the asymmetric Mach-Zehnder filter 102, and is output by respective output ports 1022 and 1023 to respective optical monitors 106 and 107. The optical monitor 106 detects the light intensity $I_{22}$ output by the output port 1022, and the optical monitor 107 detects the light intensity $I_{21}$ output by the output port 1023. Thereafter, the optical monitors 106 and 107 notify the wavelength detection circuit 109 of respective signals indicating respective values of detected light intensities.

The wavelength detection circuit 109 obtains the sum $I_2$ ($=I_{21}+I_{22}$) of the light intensity $I_{22}$ indicated by the signal notified by the optical monitor 106 and the light intensity $I_{21}$ indicated by the signal notified by the optical monitor 107, and obtains the filter transmittance $I_{21}/I_2$ of the light passing through the optical monitor 107.

Before the heater control circuit 110 changes power to be supplied (the power P), that is, when the temperature of the wavelength adjusting heater 103 is T, the filter transmissive characteristic of the asymmetric Mach-Zehnder filter 102 is the continuous line in FIG. 5. Consequently, if the obtained filter transmittance is "b0", the wavelength of the local oscillated light 3 is "$\lambda_{def2}$".

However, when the heater control circuit 110 supplies the power ΔP+P to the wavelength adjusting heater 103, and the temperature of the wavelength adjusting heater 103 becomes ΔT+T, the filter transmissive characteristic of the asymmetric Mach-Zehnder filter 102 changes as is indicated by the dotted line in FIG. 5. That is, the filter transmissive characteristic of the asymmetric Mach-Zehnder filter 102 is shifted in the horizontal direction by what corresponds to a shifting of the wavelength of the signal light 2. In this case, the wavelength corresponding to the filter transmittance "b0" is obtained as "$\lambda_2$ ($=\lambda_{def2}+\lambda_{diff}$)". $\lambda_1-\lambda_2=\lambda_{def1}+\lambda_{def2}=\lambda_{shift}$ is satisfied because of $\lambda_{diff}\lambda_1-\lambda_{def1}$, therefore the wavelength of the local oscillated light 3 maintaining the constant difference "$\lambda_{shift}$" from the signal light 2 can be obtained.

That is, the filter transmittance of the asymmetric Mach-Zehnder filter 101 is controlled to maintain a constant value at the reference value "a0", and the filter transmittance of the asymmetric Mach-Zehnder filter 102 is controlled to maintain a constant value at the reference value "b0". Thus, even if the wavelength of the signal light 2 that enters the asymmetric Mach-Zehnder filter 101 is shifted from "$\lambda_{def1}$", the wavelength of the local oscillated light 3 automatically follows the wavelength of the signal light 2. The wavelength detection circuit 109 notifies the laser wavelength adjusting circuit 111 of a signal specifying the obtained wavelength "$\lambda_2$" of the local oscillated light 3.

The laser wavelength adjusting circuit 111 transmits a signal specifying that the wavelength of the local oscillated light 3 is "$\lambda_2$", and the local oscillation light source 300 outputs the local oscillated light 3 having the wavelength of "$\lambda_2$".

According to the embodiment, because the wavelength of the local oscillated light 3 and the wavelength of the signal light 2 are controlled in association with the common wavelength adjusting heater, it becomes possible to control the wavelength of the local oscillated light 3 highly stably with respect to the wavelength of the signal light 2. Moreover according to the embodiment, one PLC element has two asymmetric Mach-Zehnder filters 101, 102 the relative relationship of which are fully stable, so that the configuration of the device becomes remarkably simple. Therefore, accordingly, the embodiment enables stabilization of a system and reduction of a cost.

The foregoing wavelength control device 100 can be configured as a homodyne detecting system by setting an appropriate control target and in order to make the wavelength of the signal light 2 and the wavelength of the local oscillated light 3 consistent. Moreover, the foregoing wavelength control device 100 can be also configured as a heterodyne detecting system using an intermediate frequency by setting an appropriate control target in order to give a constant wavelength difference to the local oscillated light 3 with respect to the signal light 2.

Although a part of or the whole of the foregoing embodiment can be described as following supplementary notes, the present invention is not limited to the following supplementary notes.

(Supplementary Note 1)

A wavelength control device comprising: a first Mach-Zehnder filter which includes two waveguides, receives a first optical signal from an end of either one of the two waveguides, and outputs a predetermined optical signal from the two waveguides based on a wavelength of the first optical signal; a second Mach-Zehnder filter which includes two waveguides, receives a second optical signal from an end of either one of the two waveguides, and outputs a predetermined optical signal from the two waveguides based on a wavelength of the second optical signal; a heating unit which heats a part of either one of the waveguides of the first Mach-Zehnder filter and a part of either one of the waveguides of the second Mach-Zehnder filter; a first wavelength detecting unit which detects a wavelength of the optical signal received by the first Mach-Zehnder filter based on an intensity of the optical signal output by the two waveguides of the first Mach-Zehnder filter; a second wavelength detecting unit which detects a wavelength of the optical signal received by the second Mach-Zehnder filter based on an intensity of the optical signal output by the two waveguides of the second Mach-Zehnder filter; a power control unit which adjusts a heating level by controlling power to be supplied to the heating unit based on the wavelength detected by the first wavelength detecting unit; and an output unit which outputs a signal instructing a wavelength of the second optical signal based on the wavelength detected by the second wavelength detecting unit.

(Supplementary Note 2)

The wavelength control device according to the supplementary note 1, in which the first wavelength detecting unit retains pieces of information on a sum of respective intensities of the optical signals output by the two waveguides of the first Mach-Zehnder filter, a ratio (hereinafter, referred to as a "first transmittance") of the sum of the intensities relative to an intensity of the optical signal output by either one of the waveguides, and a relationship with the wavelength of the optical signal received by the first Mach-Zehnder filter, obtains the first transmittance, and detects the wavelength of the optical signal received by the first Mach-Zehnder filter with reference to the pieces of the information, and the second wavelength detecting unit has pieces of information on respective intensities of optical signals output by the two waveguides of the second Mach-Zehnder filter, a ratio (hereinafter, referred to as a "second transmittance") of the intensities relative to an intensity of the optical signal output by either one of the waveguides, and a relationship with the wavelength of the optical signal received by the second Mach-Zehnder filter, obtains the second transmittance, and detects the wavelength of the optical signal received by the second Mach-Zehnder filter with reference to the pieces of the information.

(Supplementary Note 3)

The wavelength control device according to supplementary notes 1 or 2, in which the power control unit stores a wavelength value that is a reference to the first optical signal, obtains a difference between the wavelength value and a wavelength value detected by the first wavelength detecting unit, and controls power to be supplied to the heating unit so that the difference becomes small.

(Supplementary Note 4)

A wavelength control method that is executed by a wavelength control device comprising: a first Mach-Zehnder filter which includes two waveguides, receives a first optical signal from an end of either one of the two waveguides, and outputs a predetermined optical signal from the two waveguides based on a wavelength of the first optical signal; a second Mach-Zehnder filter which includes two waveguides, receives a second optical signal from an end of either one of the two waveguides, and outputs a predetermined optical signal from the two waveguides based on a wavelength of the second optical signal; a heating unit; a first wavelength detecting unit; a second wavelength detecting unit; a power control unit; and an output unit, the wavelength control method including: a heating process in which the heating unit heats a part of either one of the waveguides of the first Mach-Zehnder filter and a part of either one of the waveguides of the second Mach-Zehnder filter; a first wavelength detecting process in which the first wavelength detecting unit detects a wavelength of the optical signal received by the first Mach-Zehnder filter based on an intensity of the optical signal output by the two waveguides of the first Mach-Zehnder filter; a second wavelength detecting process in which the second wavelength detecting unit detects a wavelength of the optical signal received by the second Mach-Zehnder filter based on an intensity of the optical signal output by the two waveguides of the second Mach-Zehnder filter; a power control process in which the power control unit adjusts a heating level by controlling power to be supplied to the heating unit based on the wavelength detected by the first wavelength detecting unit; and an outputting process in which the output unit outputs a signal instructing a wavelength of the second optical signal based on the wavelength of detected by the second wavelength detecting unit.

(Supplementary Note 5)

A wavelength control device comprising: a first Mach-Zehnder filter which includes two waveguides, receives a first optical signal from an end of either one of the two waveguides, and outputs a predetermined optical signal from the two waveguides based on a wavelength of the first optical signal; a second Mach-Zehnder filter which includes two waveguides, receives a second optical signal from an end of either one of the two waveguides, and outputs a predetermined optical signal from the two waveguides based on a wavelength of the second optical signal; heating means for heating a part of either one of the waveguides of the first Mach-Zehnder filter and a part of either one of the waveguides of the second Mach-Zehnder filter; first wavelength detecting means for detecting a wavelength of the optical signal received by the first Mach-Zehnder filter based on an intensity of the optical signal output by the two waveguides of the first Mach-Zehnder filter; second wavelength detecting means for detecting a wavelength of the optical signal received by the second Mach-Zehnder filter based on an intensity of the optical signal output by the two waveguides of the second Mach-Zehnder filter; power control means for adjusting a heating level by controlling power to be supplied to the heating unit based on the wavelength detected by the first wavelength detecting means; and output means for outputting a signal instructing a wavelength of the second optical signal based on the wavelength detected by the second wavelength detecting means.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A wavelength control device comprising:
   a first Mach-Zehnder filter which includes two waveguides, receives a first optical signal from an end of either one of the two waveguides, and outputs a predetermined optical signal from the two waveguides based on a wavelength of the first optical signal;
   a second Mach-Zehnder filter which includes two waveguides, receives a second optical signal from an end of either one of the two waveguides, and outputs a predetermined optical signal from the two waveguides based on a wavelength of the second optical signal;
a heating unit which heats a part of either one of the waveguides of the first Mach-Zehnder filter and a part of either one of the waveguides of the second Mach-Zehnder filter;
a first wavelength detecting unit which detects a wavelength of the optical signal received by the first Mach-Zehnder filter based on an intensity of the optical signal output by the two waveguides of the first Mach-Zehnder filter;
a second wavelength detecting unit which detects a wavelength of the optical signal received by the second Mach-Zehnder filter based on an intensity of the optical signal output by the two waveguides of the second Mach-Zehnder filter;
a power control unit which adjusts a heating level by controlling power to be supplied to the heating unit based on the wavelength detected by the first wavelength detecting unit;
an output unit which outputs a signal instructing a wavelength of the second optical signal based on the wavelength detected by the second wavelength detecting unit;
a plurality of optical monitors at an end of each of each waveguide of each of the first Mach-Zehnder filter and the second Mach-Zehnder filter;
a first optical tap that taps the first optical signal to feed the first Mach-Zehnder filter;
a second optical tap that taps the second optical signal to feed the second Mach-Zehnder filter; and
a local oscillation control source instructed and controlled by the output unit.

2. The wavelength control device according to claim 1, wherein the first wavelength detecting unit
retains pieces of information on a sum of respective intensities of the optical signals output by the two waveguides of the first Mach-Zehnder filter, a ratio (hereinafter, referred to as a "first transmittance") of the intensities relative to an intensity of the optical signal output by either one of the waveguides, and a relationship with the wavelength of the optical signal received by the first Mach-Zehnder filter,
obtains the first transmittance, and detects the wavelength of the optical signal received by the first Mach-Zehnder filter with reference to the pieces of the information,
and the second wavelength detecting unit has pieces of information on respective intensities of optical signals output by the two waveguides of the second Mach-Zehnder filter, a ratio (hereinafter, referred to as a "second transmittance") of the intensities relative to an intensity of the optical signal output by either one of the waveguides, and a relationship with the wavelength of the optical signal received by the second Mach-Zehnder filter, obtains the second transmittance, and detects the wavelength of the optical signal received by the second Mach-Zehnder filter with reference to the pieces of the information.

3. The wavelength control device according to claim 1, wherein the power control unit stores a wavelength value that is a reference to the first optical signal, obtains a difference between the wavelength value and a wavelength value detected by the first wavelength detecting unit, and controls power to be supplied to the heating unit so that the difference becomes small.

4. A wavelength control device comprising:
a first Mach-Zehnder filter which includes two waveguides, receives a first optical signal from an end of either one of the two waveguides, and outputs a predetermined optical signal from the two waveguides based on a wavelength of the first optical signal;
a second Mach-Zehnder filter which includes two waveguides, receives a second optical signal from an end of either one of the two waveguides, and outputs a predetermined optical signal from the two waveguides based on a wavelength of the second optical signal;
heating means for heating a part of either one of the waveguides of the first Mach-Zehnder filter and a part of either one of the waveguides of the second Mach-Zehnder filter;
first wavelength detecting means for detecting a wavelength of the optical signal received by the first Mach-Zehnder filter based on an intensity of the optical signal output by the two waveguides of the first Mach-Zehnder filter;
second wavelength detecting means for detecting a wavelength of the optical signal received by the second Mach-Zehnder filter based on an intensity of the optical signal output by the two waveguides of the second Mach-Zehnder filter;
power control means for adjusting a heating level by controlling power to be supplied to the heating unit based on the wavelength detected by the first wavelength detecting means;
output means for outputting a signal instructing a wavelength of the second optical signal based on the wavelength detected by the second wavelength detecting means;
a plurality of optical monitors at an end of each of each waveguide of each of the first Mach-Zehnder filter and the second Mach-Zehnder filter;
a first optical tap that taps the first optical signal to feed the first Mach-Zehnder filter;
a second optical tap that taps the second optical signal to feed the second Mach-Zehnder filter; and
a local oscillation control source instructed and controlled by the output means.

* * * * *